Sept. 8, 1964     W. A. MINIX     3,147,615
AIR GAGE HEAD

Filed July 10, 1963     2 Sheets-Sheet 1

INVENTOR.
WILLIAM A. MINIX
BY Cullen, Sloman & Cantor
ATTORNEYS

Sept. 8, 1964 W. A. MINIX 3,147,615
AIR GAGE HEAD
Filed July 10, 1963 2 Sheets-Sheet 2
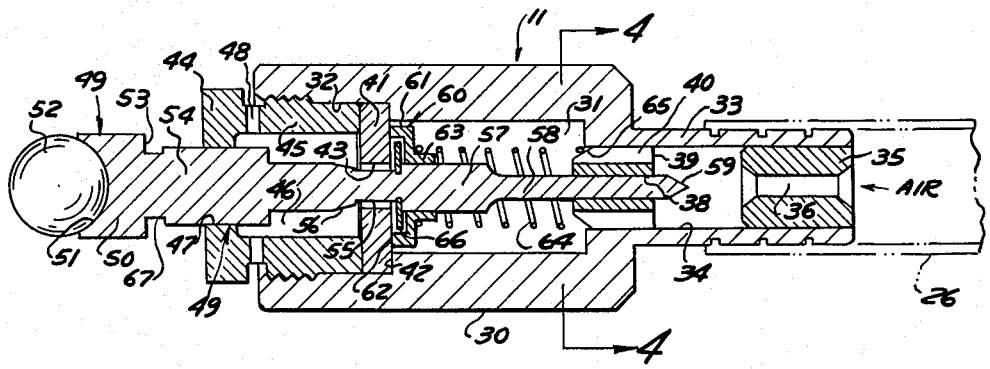
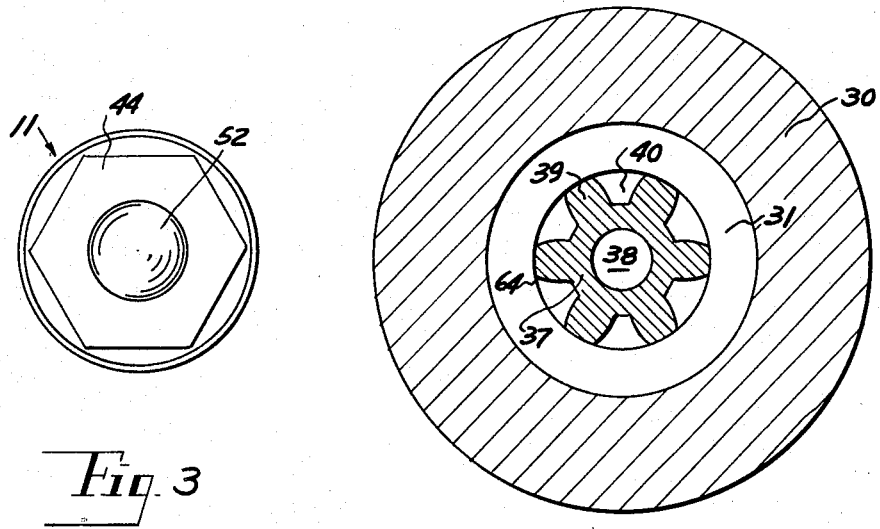
INVENTOR.
WILLIAM A. MINIX
BY Cullen, Sloman & Cantor
ATTORNEYS United States Patent Office 3,147,615
Patented Sept. 8, 1964

3,147,615
AIR GAGE HEAD
William A. Minix, Detroit, Mich., assignor to Freeland Gauge Company, Detroit, Mich.
Filed July 10, 1963, Ser. No. 294,024
5 Claims. (Cl. 73—37.5)

The present invention relates to an air gage for controlling air bleeding in a pneumatic measuring circuit.

Heretofore, various types of air gages or gage heads have been employed in circuits of this nature for the purpose of responding to the surface of a work piece for checking the dimensions thereof and wherein the deflection of the gage element in responding to the surface of the work piece permits the bleeding of air through the gage device in turn effecting the flow of air in a measuring circuit to give invisible indication as to whether the work piece meets or does not meet a predetermined standard dimension within a predetermined range.

It is an object of the present invention to provide an improved air intake bearing within the inlet portion of the body of the gage head which is constructed in the cross sectional form of a gear providing a series of elongated peripheral circularly arranged air inlet orifices for communication with the bore of the body.

One of the difficulties in air gages of this type has been the excessive wastage of air through the gage body when the gage head is not in use. It is therefore another object to provide an automatic shut-off valve so that air does not flow through the body when the gage is not in use. In the present construction air is employed only when the gage head is being used.

Heretofore, in gage constructions of this type the air escape outlets have been so located relative to the gage body and its mounting as to eventually clog up with dirt. It is another object to provide an improved structure, namely a bearing nut upon the forward end of the body adjacent the contactor wherein the air outlets for the escape of air are formed radially through the bearing nut, in advance of the gage body. This provides a self-cleaning feature at the air outlets and prevents the accumulation of dirt or the blocking of the outlet orifices as was often the case where the air outlets were disposed rearwardly of the gage body or nested within a recess in the holding fixture.

These and other objects will be seen from the following specification and claims in conjunction with the appended drawings in which:

FIG. 2 is a longitudinal section of the air gage on an increased scale.

FIG. 3 is an end view thereof.

FIG. 4 is a fragmentary section taken in the direction of arrows 4—4 of FIG. 2.

It will be understood that the above drawings illustrate merely a preferred embodiment of the invention, and that other embodiments are contemplated within the scope of the claims hereafter set forth.

*Pneumatic Measuring Circuit*

Figure 1:
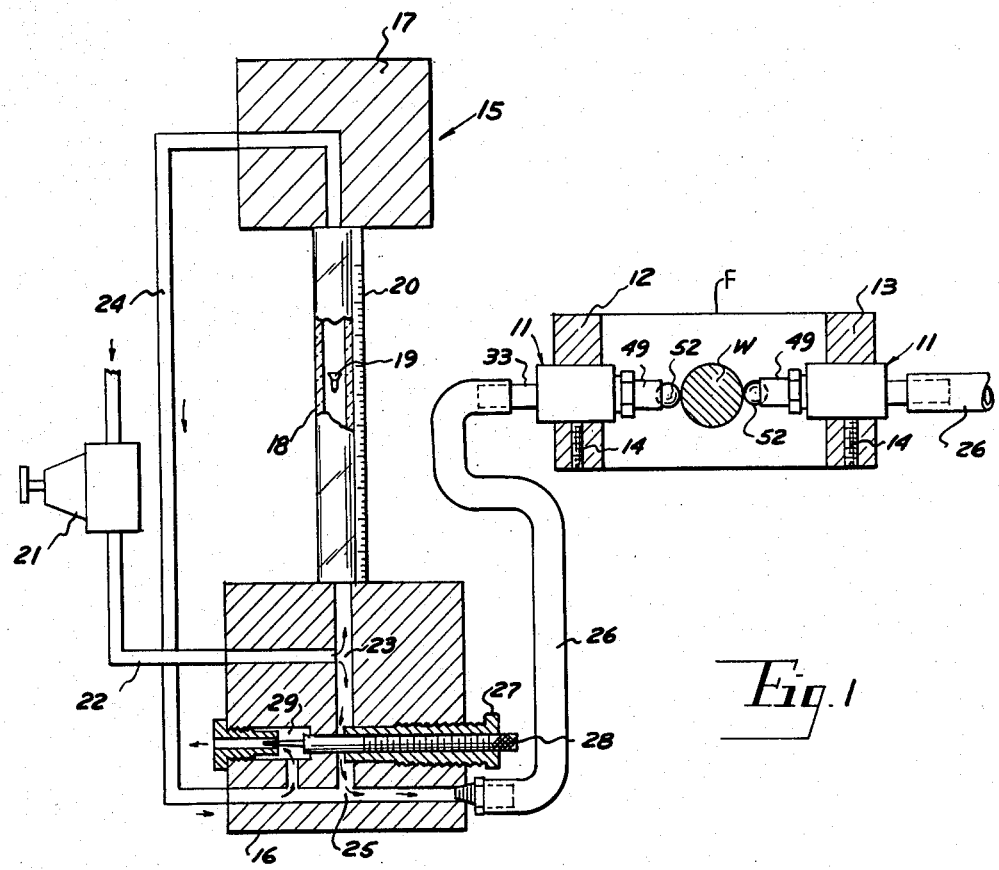
FIG. 1 is a partly sectioned schematic view illustrating the present air gage or gage head as mounted in a fixture and used in conjunction with a pneumatic measuring air flow circuit.

The present air gage is employed in connection with a pneumatic air flow measuring circuit. In FIG. 1, a pair of the present air gage heads 11 are mounted within blocks 12 and 13 of fixture F and secured at 14 in diametrically opposed relation, and between which work piece W is projected for gaging purposes.

The pneumatic measuring circuit includes an air flow gage assembly generally indicated at 15 including valve body 16, tube support 17 with glass flow tube 18 interposed, within which the float 19 is movably positioned depending upon the rate of flow of air therethrough. A suitable indicating scale 20 is provided.

Air from a suitable source is directed through pressure regulator 21 for delivering air under pressure such as ten to twelve pounds per square inch through conduit 22 to intake chamber 23 of the valve body. The air passes upwardly through tube 18, through support 17 and conduit 24 returning to delivery chamber 25 in the valve body, and thence through flexible plastic or other conduit 26 connected over inlet 33, FIG. 2, of one of the gaging heads 11, FIG. 1.

Associated with intake chamber 23 is a by-pass valve 27 adjustably mounted within valve body 16 for the purpose of by-passing some of the air from the intake chamber directly to delivery chamber 25 rather than through the glass tube 18. This is for the purpose of regulating the magnification factor of the air measuring system.

There is also provided concentrically with the by-pass valve a bleed valve 28 which controls the release of some of the air within delivery chamber 25 through passage 29 directly to atmosphere. This is an air bleed for adjusting float 19 within tube 18 under certain conditions and with a predetermined initial delivery pressure from regulator 21.

The detail of the construction and operation of said pneumatic measuring air flow circuit is more fully disclosed in my presently co-pending patent application executed June 7, 1963, Serial No. 290,526, filed June 25, 1963.

*Air Gage or Gaging Head*

The present invention is particularly directed to the construction of the air gage or gage head 11, which is shown in fixture F for gaging purposes in FIG. 1, one of said gage heads being indicated in detail in FIG. 2.

*Air Gage Body*

Said air gage 11 includes elongated body 30 having axial bore 31, counterbore 32 of increased diameter defining shoulder 42 and at one end the elongated air inlet 33 with axial bore 34.

Within the outer end of said inlet there is an economizer orifice, preferably constructed of brass, including body 35 snugly pressed within bore 34. Body 35 has an axial orifice or passage 36 by which air from tube 26 is directed into inlet 33. Within the inner end of said inlet and adjacent bore 31 there is press fitted an intake bearing shown in cross section, FIG. 4. Bearing 37 has a central bore 38 and a series of radially directed elongated peripheral flutes 39 defining therebetween a series of radially disposed peripheral elongated air passages 40 which communicate with bore 31.

*Orifice Plate*

Orifice plate 41 is loosely positioned within counterbore 32, bears against shoulder 42 adjacent bore 31 and has a central enlarged aperture 43 establishing communication between bore 31 and chamber 46, FIG. 2.

*Bearing Nut*

The hollow open ended bearing nut 44 has a tubular shank 45 threaded into counterbore 32 at one end of body 30 and retainingly engages orifice plate 41. The head of bearing nut 44 has an axial bore 47 which communicates with the interior enlarged bore or chamber 46. The forward end of tubular portion 45 projects outwardly of body 30 and has a series of radially extending outlet apertures 48 to permit the escape of air from bore 46 to the atmosphere.

Stem

The control mechanism of the present gage head is the elongated axial stem 49 which includes head 50 having a hemispherical recess 51 in its outer end. Within said recess is nested and fixedly secured the preferably carbide ball 52, also shown in FIG. 1, adapted for operative engagement with the surface of the work piece W whose dimension is to be gaged.

Head 50 terminates in shoulder 53 which serves as a positive stop limiting inward movement of the stem with respect to the gage body. Said shoulder merges with the shank portion 54 of cylindrical shape which is slidably and guidably positioned within bore 47 of bearing nut 44.

The stem intermediate ends includes an annular portion 55 loosely arranged within aperture 43 of orifice plate 41 and terminating at one end in the outwardly and forwardly tapered flow control valve element 56. This is adapted for movements into aperture 43 of the orifice plate in varying amounts depending upon movements of the stem as controlled by the carbide ball in engaging the work W, FIG. 1, whose dimension is to be gaged.

Rearwardly of annular portion 55 the stem includes the cylindrical portion 57 which terminates in the elongated shank 58 of reduced diameter pointed at its outer end at 59 and guidably and movably supported and journaled within the central aperture 38 of intake bearing 37, FIG. 2.

Automatic Shut-Off Valve

The gage body includes therein an automatic shut-off valve by which when the gage is not in use air will not flow therethrough and be wasted. For this purpose there is provided an annular valve body 60 including hollow annular flange 61 which normally seats at 62 throughout 360° against one side of orifice plate 41. Its opposite side terminates in shank 63 of reduced diameter loosely mounted axially over portion 57 of stem 49 for sliding movements thereover.

Coiled spring 64 is loosely mounted around portions 57–58 of said stem and at one end engages valve body 60 and at its opposite end bears against said body or more particularly is centered by the tapered projection 65 forming a part of the intake bearing 37, FIG. 2.

Locking ring 66 is mounted and secured around a central portion of stem 49 upon one side of orifice plate 41 and normally nested within body 61 of the automatic shut-off valve. Ring 66 limits outward movement of the stem relative to the body. Said ring is further employed to actuate and unseat the automatic shut-off valve upon inward movement of said stem under the control of ball 52. After a slight inward movement of said stem ring 66 engages shut-off valve 60 unseating the same as at 62 and permits the flow of air from bore 31 into and through orifice 43 and into chamber 46 of bearing nut 44. Thus, when the ball 52 is out of contact with the work piece W, spring 64 is effective to seat valve 60 against the orifice plate and shuts off the flow of air through the gage body.

Operation

In normal operation of the present gaging head or air gage as set up within fixture F of FIG. 1, work piece W is introduced between a pair of said gage heads and will effect axial inward movements of the respective stems 49. As viewed in FIG. 2 until there has been a limited initial inward movement of stem 49 no flow of air passes from bore 31 to chamber 46.

After a limited inward movement equal to the distance between ring 66 and the inner surface of valve 60, any further inward movement depending upon the dimension of part W being gaged causes ring 66 to operatively engage the shut-off valve 60 unseating the same relative to its annular seat 62.

Air may then pass from bore 31 around valve 60 and through orifice 43, into chamber 46, and out to the atmosphere through the series of outlets 48.

The control mechanism includes the forwardly and outwardly tapered flow control valve element 56, FIG. 2, which as it is projected partially in to orifice 43 begins to close off some of the flow of air therethrough. In an extreme inward positioning of said stem the flow through orifice 43 could be completely closed off.

In operation there would normally be an intermediate positioning of valve element 56 within or with respect to the outer edge portion of orifice 43 which would control variably the amount of air which passes from bore 31 into chamber 46 and thence to the atmosphere.

Figure 5:
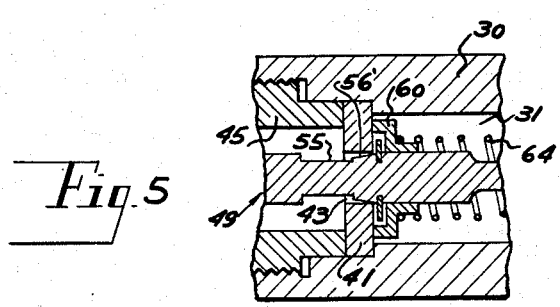
FIG. 5 is a fragmentary section similar to FIG. 2 showing a slightly different form of stem construction.

FIG. 5 shows a slight variation only in the sense that the valve element 56' is reversed in direction of taper with respect to that shown in FIG. 2. This means that with valve element 56' nested within orifice 43, this orifice is normally closed so that as valve 60 is unseated, the amount of air which will pass through the said orifice depends upon the extent to which the stem 49 is projected axially to the right of FIG. 5. The operation is substantially the same with the one exception that orifice 43 is normally closed, while in FIG. 2 it is normally open.

The automatic shut-off valve normally does not effect the operation of the air gage itself since it merely closes off the flow of air through the gage body when the gage is not in use. Once stem 49 has been activated by work piece W, FIG. 1, and is projected inwardly, shut-off valve 60 is unseated as at 62 and thereafter the control of air flow through the body and particularly through aperture 43 of orifice plate 41 is regulated by the annular outwardly tapered valve element 56. It is the longitudinal positioning of this valve element of FIG. 2 or 56' in FIG. 5 which variably regulates the rate of air flow through the gage body and out through apertures 48, in turn modifying the air flow in the measuring circuit 15 of FIG. 1.

As viewed in FIG. 2, the inner pointed end 59 of stem 49 is in longitudinal axial registry with the tapered end of passage 36 in orifice 35. On extreme inward movements of stem 49, limited by stop 53, there is a sufficient clearance so that the stem end 59 does not engage orifice body 35.

Stem end 59 also serves to break up the air to flow through passages 40.

An annular groove 67 adjacent shoulder stop 53 of head 50 is provided for the purpose of receiving various sized master gage feelers employed in the initial setting up of the gaging head with respect to the air flow measuring device generally indicated at 15, FIG. 1.

Having described my invention, reference should now be had to the following claims.

I claim:

1. In an air gage for controlling air bleeding in a pneumatic measuring circuit: the improvement comprising a body having a bore; a counterbore and an elongated air inlet;

an air intake bearing in said inlet having a series of radially directed peripheral flutes defining a series of radially disposed peripheral air passages arranged in a circle communicating with said bore;

a centrally apertured orifice plate in said counterbore;

a hollow open ended bearing nut threaded into the counterbore retainingly engaging said orifice plate adjacent one end of said bore, there being a series of radial air outlets formed through the nut arranged outwardly of said body;

a work piece engaging stem axially mounted within the body and adjacent its opposite ends guidably, slidably and axially journaled respectively through said intake bearing and said bearing nut and loosely projected through said orifice plate;

an axially movable spring biased normally closed automatic shut-off valve within said bore normally seated against said orifice plate axially mounted upon and connected to said stem for unseating movement on inward movement of said stem relative to said body, permitting flow of air from said bore and through said orifice plate into said bearing nut, and an annular outwardly and forwardly tapered flow control valve element on said stem movable into the aperture of said orifice plate for variably regulating the rate of air flow therethrough.

2. In the air gage defined in claim 1, the outer end of said stem having a hemispherically shaped recess therein, and a carbide ball axially nested within said recess and secured to said stem.

3. In the air gage defined in claim 1, said air intake being of gear form in cross section with the gear teeth segments extending to and engaging the wall of said inlet and defining said passages.

4. In the air gage of claim 1, said shut-off valve being loosely and slidably mounted on said stem, the connection of said stem to said shut-off valve including a locking ring engageable with said orifice plate on movement of the stem in one direction to prevent axial disassembly of the stem from the body, and operatively engageable with said shut-off valve for unseating the same on movement of the stem in the opposite direction, the spring bias of said shut-off valve including a coiled spring interposed between said shut-off valve and said body at one end of said bore.

5. In an air gage, the improvement comprising a body having a bore, a counterbore and an elongated air inlet;
an air intake bearing in said inlet having a series of circularly arranged peripheral elongated air passages communicating with said bore;
a centrally apertured orifice plate in said counterbore;
a hollow open ended bearing nut threaded into the counterbore retainingly engaging said orifice plate, there being a series of radial outlets formed through the nut adjacent one end arranged outwardly of said body;
a work piece engaging stem axially mounted within the body and adjacent its opposite ends guidably, slidably and axially journaled respectively through said intake bearing and said bearing nut and loosely projected through said orifice plate;
an axially movable spring biased normally closed automatic shut-off valve within said bore normally seated against said orifice plate closing off its aperture axially mounted upon and connected to said stem for unseating movement relative to said plate on inward movement of said stem relative to said body, permitting flow of air from said bore and through said orifice plate into said bearing nut, and an annular outwardly and forwardly tapered flow control valve element on said stem movable relatively to the aperture of said orifice plate for variably regulating the rate of air flow therethrough.

References Cited in the file of this patent
UNITED STATES PATENTS

| | | |
|---|---|---|
| 2,218,871 | Broden | Oct. 22, 1940 |
| 2,831,257 | Aller | Apr. 22, 1958 |